United States Patent
Higgins et al.

(10) Patent No.: US 11,543,529 B1
(45) Date of Patent: Jan. 3, 2023

(54) ADAPTIVE WEIGHTING OF MULTIPLE SOURCES IN A MAGNETIC OR HYBRID TRACKING SYSTEM

(71) Applicant: ALKEN Inc., Colchester, VT (US)

(72) Inventors: Robert F. Higgins, South Burlington, VT (US); Keith M. Hanf, Colchester, VT (US); Allan G. Rodgers, Jr., Waterbury, VT (US); Allan G. Rodgers, Jericho, VT (US)

(73) Assignee: ALKEN Inc., Colchester, VT (US)

( * ) Notice: Subject to any disclaimer, the term of this patent is extended or adjusted under 35 U.S.C. 154(b) by 389 days.

(21) Appl. No.: 16/773,460

(22) Filed: Jan. 27, 2020

Related U.S. Application Data (60) Provisional application No. 62/797,249, filed on Jan. 26, 2019.

(51) Int. Cl.
| | | |
|---|---|---|
| G01B 11/14 | (2006.01) | |
| G01S 17/66 | (2006.01) | |
| G06F 1/16 | (2006.01) | |
| G02B 27/01 | (2006.01) | |

(52) U.S. Cl.
CPC .......... *G01S 17/66* (2013.01); *G02B 27/017* (2013.01); *G06F 1/163* (2013.01)

(58) Field of Classification Search
CPC . G01B 7/00; G01B 7/14; G01B 11/00; G01B 11/14; G06F 3/00; G06F 3/01; H01R 13/6691; G01D 5/12; G01D 5/22
USPC ............................................. 250/214 R, 221
See application file for complete search history.

(56) References Cited

U.S. PATENT DOCUMENTS

| | | | |
|---|---|---|---|
| 5,744,953 A * | 4/1998 | Hansen ................... | G06F 3/011 324/207.17 |
| 6,172,499 B1 | 1/2001 | Ashe | |
| 7,640,106 B1 | 12/2009 | Stokar et al. | |
| 8,723,509 B2 | 5/2014 | Patterson, III et al. | |
| 10,261,162 B2 | 4/2019 | Bucknor et al. | |
| 2019/0113966 A1 | 4/2019 | Connellan et al. | |
| 2019/0353745 A1 | 11/2019 | Zur et al. | |

FOREIGN PATENT DOCUMENTS

WO      2018102009 A1    6/2018

* cited by examiner

*Primary Examiner* — Que Tan Le
(74) *Attorney, Agent, or Firm* — Lerner, David, Littenberg, Krumholz & Mentlik, LLP (57) ABSTRACT

An apparatus and method for implementing a technique for adaptively assigning weighting factors to position and orientation determinations in an electromagnetic or hybrid tracking system having multiple transmitters or multiple receivers. The apparatus may reduce the impact of eddy current distortion to the position and orientation determinations.

21 Claims, 6 Drawing Sheets

ADAPTIVE WEIGHTING OF MULTIPLE SOURCES IN A MAGNETIC OR HYBRID TRACKING SYSTEM

CROSS-REFERENCE TO RELATED APPLICATIONS

The present application claims the benefit of the filing date of U.S. Provisional Patent Application No. 62/797,249 filed Jan. 26, 2019, the disclosure of which is hereby incorporated herein by reference.

TECHNICAL FIELD

The present disclosure generally relates to electromagnetic tracking systems.

BACKGROUND

Electromagnetic tracking systems use electromagnetic field emitters and sensors to determine position and/or orientation (PnO) of a tracked object. In hybrid tracking systems, other technologies such as gyroscopes, accelerometers, magnetometers, barometers and others, can be combined with the electromagnetic emitters and sensors in order to improve the PnO determinations. The electromagnetic and other sensors communicate signals to a processing device included in the system electronics.

Some systems use multiple emitters or sources set up in a fixed pattern to create a universal reference frame. One or more sensors are then free to move within a tracking region. At any given time, the sensor remains close to at least one of the multiple sources. Thus, the effects of eddy current distortion between the sensor and at least one emitter may be relatively low at any given time.

Typically, the relative signal strengths of the sources are used to determine which one of the sources to rely on for determining PnO. Stated another way, eddy current distortion is typically lowest, and signal strength is typically highest, for a source-sensor pair having the lowest distance of separation. Therefore, signal strength is typically a good indicator of reliability for each given source-sensor pair. However, the assumed correlation between eddy current distortion and signal strength is not always accurate.

SUMMARY

One aspect of the disclosure is directed to an apparatus including memory for storing instructions and one or more processors for executing the instructions. The instructions stored in the memory may be configured to cause the one or more processors to receive a plurality of electrical signals from a receiver circuit including a plurality of receiver elements aligned at different receiver axes, each receiver element configured to detect a magnetic field along its respective receiver axis, and construct each of a first matrix and a second matrix from the plurality of electrical signals, the first matrix representing respective components of a first magnetic field portion generated by a first transmitter circuit including a plurality of first transmitter coils aligned at different first transmitter axes, the second matrix representing respective components of a second magnetic field generated by a second transmitter circuit including a plurality of second transmitter coils aligned at different second transmitter axes, the first transmitter circuit and the second transmitter circuit being spaced apart from one another within a common region such that the respective first and second magnetic field portions overlap one another within the common region and are distinguishable from one another by differences in at least one of timing and frequency, for each constructed matrix, assign a weight to the constructed matrix based at least in part on a quality of structure of the electromagnetic field represented by the constructed matrix, and determine a position and an orientation of the receiver circuit based at least in part on the first matrix, the second matrix, and the respective assigned weights.

In some examples, the instructions may be configured to cause the one or more processors to, for each constructed matrix, assign the weight to the constructed matrix based further on a signal strength of the magnetic field portion represented by the constructed matrix. In some examples, the instructions may be configured to cause the one or more processors to, for each constructed matrix, determine the quality of structure and the signal strength of the magnetic field portion based on a mathematical analysis of the constructed matrix.

In some examples, the quality of structure of the magnetic field portion represented by the constructed matrix may be indicative of a degree of distortion in the magnetic field portion represented by the constructed matrix. The instructions may be configured to cause the one or more processors to determine the quality of structure of the magnetic field portion represented by the constructed matrix based on a degree of symmetry of the constructed matrix.

In some examples, each row of the constructed matrix may correspond to a common receiver element, and each column of the constructed matrix may correspond to a common transmitter coil, whereby each respective component of the magnetic field portion represented by the constructed matrix corresponds to a different transmitter coil-receiver element pair.

In some examples, the instructions stored in the memory may be configured to cause the one or more processors to identify electrical signals having a first frequency or one of a first set of frequencies as being associated with the first magnetic field portion, and identify electrical signals having a second frequency or one of a second set of frequencies as being associated with the second magnetic field portion.

In some examples, the first transmitter circuit and a phase of the second transmitter circuit may be synchronized with one another, and the instructions stored in the memory may be configured to cause the one or more processors to identify electrical signals generated at the receiver circuit during a first time as being associated with the first magnetic field portion, and identify electrical signals generated at the receiver circuit during a second time as being associated with the second magnetic field portion.

Another aspect of the disclosure is directed to an electromagnetic tracking system including a first electromagnetic tracking element configured to be affixed to a trackable object, a plurality of second electromagnetic tracking elements configured to be positioned separately from one another at fixed locations of a tracking region through which the trackable object is capable of moving, the first electromagnetic tracking element being one of (i) a transmitter circuit including a plurality of transmitter coils aligned at different transmitter axes and configured to generate a magnetic field or (ii) a receiver circuit including a plurality of receiver elements at different receiver axes, each receiver element configured to detect a magnetic field along its respective receiver axis, each receiver element being configured to detect respective components of the magnetic field generated by each of the transmitter coils, and to generate an electrical signal corresponding to the detected respective components of the magnetic field, the plurality of second electromagnetic tracking elements being a plurality of the other one of (i) the transmitter circuit or (ii) the receiver circuit, whereby the electromagnetic tracking system includes a plurality of transmitter-receiver pairs between the first element and the respective plurality of second elements, and one or more processors. The one or more processors may be configured to, for each given one of the plurality of transmitter-receiver pairs, receive a plurality of electrical signals from the receiver circuit of the given transmitter-receiver pair, the plurality of electrical signals corresponding to respective components of the magnetic field generated by the transmitter circuit of the given transmitter-receiver pair and detected by a corresponding one of the receiver elements, construct a matrix representing the respective components of the magnetic field detected by the plurality of receiver elements, each row of the first matrix corresponding to a common receiver element, and each column of the first matrix corresponding to a common transmitter coil, each respective component represented in the matrix corresponding to a different transmitter coil-receiver element pairing of the given transmitter-receiver pair, for each constructed matrix, determine a quality of structure of a dipole field detected by the plurality of receiver elements based at least in part on an analysis of the constructed matrix and assign a weight to the constructed matrix based at least in part on the determined quality of structure, and determine a position and an orientation of the first electromagnetic tracking element relative to the plurality of second electromagnetic tracking elements based on the constructed matrices and the respective assigned weights.

In some examples, the one or more processors may be configured to, for each constructed matrix, assign the weight to the constructed matrix based further on a signal strength of the magnetic field represented by the constructed matrix. In some examples, the one or more processors may be configured to, for each constructed matrix, determine the quality of structure and the signal strength of the magnetic field based on a mathematical analysis of the constructed matrix. The quality of structure of the magnetic field represented by the constructed matrix may be indicative on a degree of distortion in the magnetic field represented by the constructed matrix. In some examples, the one or more processors may be configured to determine the quality of structure of the magnetic field represented by the constructed matrix based on a degree of symmetry of the constructed matrix.

In some examples, the first electromagnetic tracking element may be a receiver circuit and the plurality of second electromagnetic tracking elements may be transmitter circuits. The transmitter circuits may be operable to generate respective magnetic fields that overlap one another within the tracking region and such that the respective magnetic fields are multiplexed and distinguishable from one another by differences in at least one of timing and frequency.

Other aspects of the disclosure are directed to tracking systems or head mounted display systems comprising including an electromagnetic tracking system according to any of the embodiments discloses herein. The system may further include a head mounted display coupled to the electromagnetic tracking system, whereby the electromagnetic tracking system may be configured to track a position and orientation of a user of the head mounted display. Alternatively, the system may further include a wearable or handheld tracking device, whereby the receiver circuit is mounted to the tracking device to track a position and orientation of the tracking device.

Yet another aspect of the disclosure is directed to a method for determining a position and orientation of an object, a first electromagnetic tracking element being affixed to the object and a plurality of second electromagnetic tracking elements being positioned separately from one another at fixed locations of a tracking region through which the object is capable of moving, the first electromagnetic tracking element being one of (i) a transmitter circuit including a plurality of transmitter coils aligned at different transmitter axes and configured to generate a magnetic field or (ii) a receiver circuit including a plurality of receiver elements aligned at different receiver axes, each receiver element configured to detect a magnetic field along its respective receiver axis, each receiver element being configured to detect respective components of the magnetic field generated by each of the transmitter coils and generate an electrical signal representing the detected respective components of the magnetic field, the plurality of second electromagnetic tracking elements being a plurality of the other one of (i) the transmitter circuit or (ii) the receiver circuit, whereby the electromagnetic tracking system includes a plurality of transmitter-receiver pairs between the first element and the respective plurality of second elements. The method may include, for each given one of the plurality of transmitter-receiver pairs, constructing, by one or more processors, a matrix representing respective components of the magnetic field detected by the plurality of receiver elements, each row of the matrix corresponding to a common receiver element, and each column of the first matrix corresponding to a common transmitter coil, each respective component represented in the matrix corresponding to a different transmitter coil-receiver element pairing of the given transmitter-receiver pair, and assigning, by the one or more processors, a weighting factor to the constructed matrix based at least in part on a quality of structure of the magnetic field represented by the constructed matrix, and determining, by the one or more processors, the position and the orientation of the object based at least in part on the constructed matrices, and the respective assigned weighting factors.

In some examples, the method may further include, for each constructed matrix, determining, by the one or more processors, the quality of structure of the magnetic field represented by the constructed matrix based on a mathematical analysis of a symmetry of the constructed matrix.

In some examples, the method may further include, for each constructed matrix, determining, by the one or more processors, a contribution of one or more distorting signals to the constructed matrix based at least in part on the determined quality of structure.

In some examples, the method may further include, for each constructed matrix, determining, by the one or more processors, the weighting factor for the constructed matrix based on each of the determined contribution of one or more distorting signals to the magnetic field represented by the constructed matrix, and respective magnitudes of the plurality of electrical signals used to construct the matrix.

In some examples, the first electromagnetic tracking element may be a receiver circuit and the plurality of second electromagnetic tracking elements may be transmitter circuits. The method may further include distinguishing, by the one or more processors, the respective magnetic fields generated by the plurality of second electromagnetic tracking elements from one another based on at least one of a frequency or a phase of the plurality of electrical signals generated by the receiver circuit.

In some examples, each of the plurality of second electromagnetic tracking elements includes a non-magnetic tracking device configured to independently track at least one of a position or orientation of the object. The method may further include, for each given non-magnetic tracking device, determining, by the one or more processors, at least one of a position or orientation of the object based on data from the given non-magnetic tracking device, and combining, by the one or more processors, the determined at least one of a position or orientation of the object with at least one of the position or the orientation of the object determined from the matrix derived from the magnetic field generated by the second electromagnetic tracking element in which the given non-magnetic tracking device is included, for each given second electromagnetic tracking element, assigning, by the one or more processors, a weighting factor to the given second electromagnetic tracking element based on the assigned weighting factor for the constructed matrix derived from the magnetic field generated by the given second electromagnetic tracking element; and determining, by the one or more processors, a hybrid position and orientation of the object based at least in part on the combined determined position and orientation from at least one second electromagnetic tracking element and the weighting factors assigned to the second electromagnetic tracking elements.

DETAILED DESCRIPTION

Figure 1:
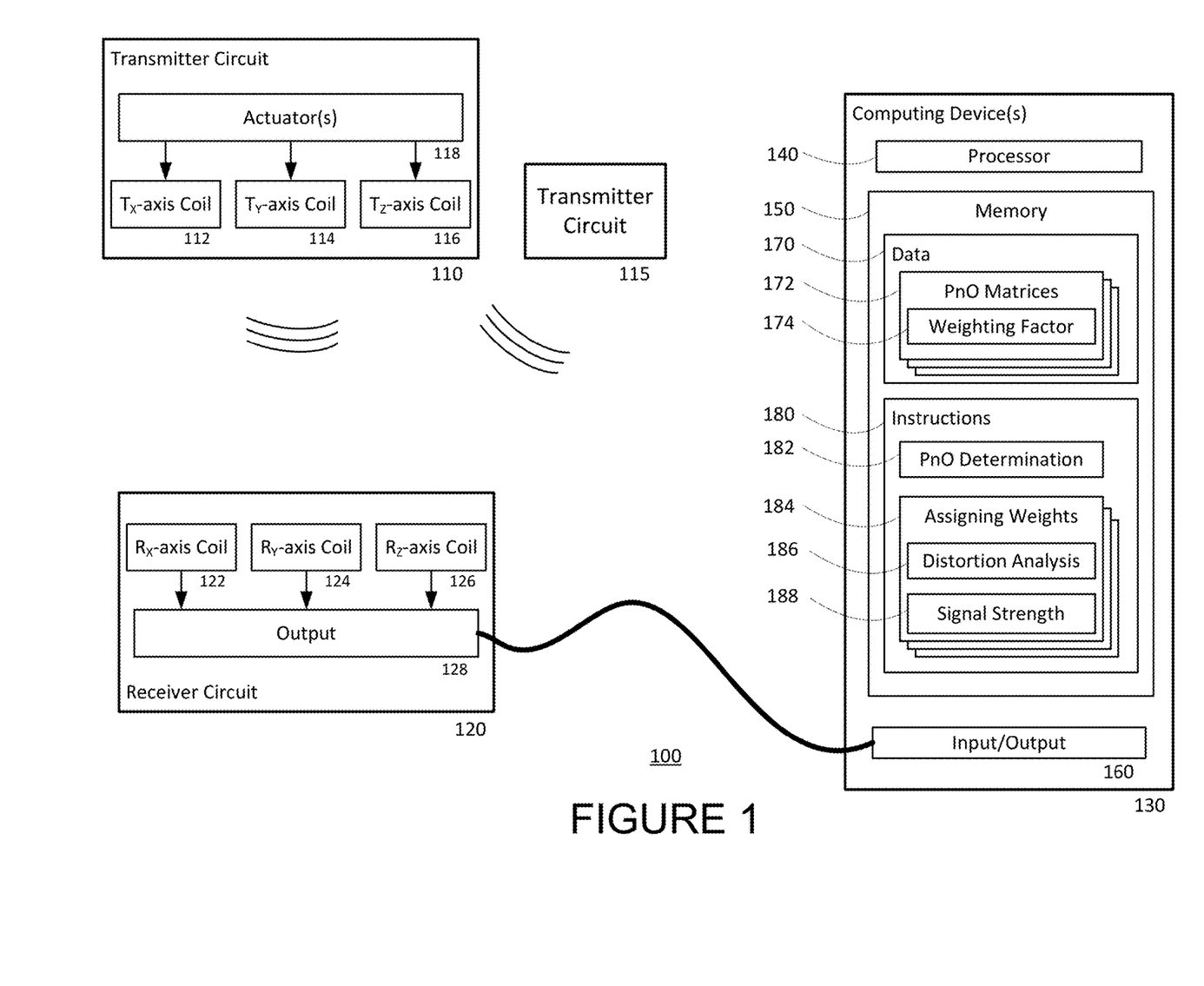
FIG. 1 is a block diagram of an electromagnetic tracking system in accordance with an embodiment of the present disclosure.

FIG. 1 is a block diagram illustrating an electromagnetic tracking system 100. The system 100 may include a plurality of transmitter circuits 110, 115 for generating respective electromagnetic fields, a receiver circuit 120 for sensing the generated electromagnetic fields and generating electrical signals based on the sensed electromagnetic fields, and one or more computing devices 130 included in the system electronics for receiving and processing the electrical signals generated by the receiver circuit 120. Each of the transmitter circuits 110, 115 and the receiver circuit 120 may be connected to the one or more computing devices 130 in order to transmit and receive data with the computing devices 130.

The transmitter circuits 110, 115 may be positioned separately from one another at fixed locations of a tracking region of the system. The magnetic fields generated by the two transmitters may overlap. The overlap between the transmitters may define a tracking region in which the moveable receiver circuit 120 may be tracked using both transmitter circuits 110, 115, meaning that both magnetic fields may be detected by the receiver circuit 120. Within the tracking region, these two magnetic fields may be thought of as a single magnetic field detected by the receiver circuit 120, whereby each transmitter circuit 110, 115 contributes a different portion of the single detected magnetic field.

In the example of FIG. 1, a connection between the receiver circuit 120 and one or more computing devices 130 is shown as a wired connection using a cable, such as a USB Type-C cable. Other cables typically used in electromagnetic tracing systems, or wireless connections, including short range communication protocols such as near-field communication (NFC), WiFi, Bluetooth, Bluetooth LE, may be used. Additionally or alternatively, the transmitter circuit and the receiver circuit may be connected to one another in a wired or wireless manner in order to provide information therebetween, such as providing phase information from the transmitter to the receiver to avoid phase ambiguity of the electromagnetic field generated by the transmitter.

In the example of FIG. 1, the transmitter circuit 110 is shown in greater detail. The transmitter circuit includes a transmitter coil array having a plurality of transmitter coils 112, 114, 116 aligned along X, Y, and Z axes of the transmitter, respectively. In FIG. 1, these axes are denoted $T_X$, $T_Y$ and $T_Z$. The X, Y and Z axes may be orthogonal to one another, or they may be different from one another without being orthogonal. Generally, the axes form a three-dimensional coordinate system (e.g., do not all extend within a common plane). The transmitter circuit 110 may further include an actuating circuit 118 configured to actuate the transmit coils at different times or different frequencies. The actuating circuit 118 may include one or more frequency generators for generating one or more alternating signals. A different frequency signal may be provided to a respective driver for driving each coil, respectively. Alternatively, the same alternating signal may be input to a multiplexer which is timed by a clock included in the transmitter, and outputs of the multiplexer may be provided to the respective drivers at different times. The drivers may further include additional components for driving the coils, such as one or more amplifier circuits. Driving the coils may result in an electromagnetic field being generated by the coils.

Transmitter circuit 115 may include the same or similar circuitry as transmitter circuit 110. In order for the respective portions of the magnetic field detected by the receiver circuit 120 to be distinguishable, the magnetic fields generated by the two transmitter circuits 110, 115 may be multiplexed with one another. For instance, the two transmitter circuits 110, 115 may be frequency multiplexed, whereby the magnetic field generated by one of the transmitter circuits may have a first frequency or multiple frequencies belonging to a first set of frequencies, and the magnetic field generated by the other of the transmitter circuits may have a second frequency or multiple frequencies belonging to a non-overlapping second set of frequencies. For further instance, the two transmitter circuits 110, 115 may be time multiplexed, whereby the magnetic field generated by one of the transmitter circuits may be generated at a first time, or more particularly have a first phase, and the magnetic field generated by the other of the transmitter circuits may be generated at a second time, or more particularly have a second phase, that does not overlap with the first time and the first phase.

Multiplexing the two transmitter circuits may require the circuits to communicate with one another, such as by a wired connection, in order to maintain synchronicity between the generated magnetic fields so that the respective detected portions can be differentiated at the receiver end. For instance, the transmitter coil arrays of each transmitter circuit may be time multiplexed, and the transmitter circuits may themselves generate different frequencies. Alternatively, the transmitter coil arrays of each transmitter circuit may be frequency multiplexed, and the transmitter circuits may themselves generate their respective magnetic fields at different times, or more particularly in different phases. Alternatively, the transmitter coil arrays of each transmitter circuit may be time multiplexed, and the transmitter circuits may generate their respective magnetic fields at different times, or more particularly in different phases. Alternatively, the transmitter coil arrays of each transmitter circuit may be frequency multiplexed, and the transmitter circuits may themselves generate their respective magnetic fields at different sets of non-overlapping frequencies.

The receiver circuit 120 includes a receiver coil array having a plurality of receiver coils 122, 124, 126 aligned along X, Y, and Z axes of the receiver circuit, respectively. In FIG. 1, these axes are denoted $R_X$, $R_Y$ and $R_Z$. As with the transmitter axes, the X, Y and Z axes of the receiver circuit 120 may be orthogonal to one another, or may be different from one another without being orthogonal. Generally, the axes form a three-dimensional coordinate system (e.g., do not all extend within a common plane). Since the receiver circuit is capable of being oriented independent of both transmitter circuits, it should be understood that the X, Y and Z axes of the receiver circuit are not necessarily aligned with the X, Y and Z axes of the transmitter circuit. By contrast, since the transmitter circuits are fixed in place and orientation, the X, Y and Z axes of the transmitter circuits 110, 115 may be aligned with one another.

In operation, the magnetic fields generated by both transmitter circuits 110, 115 may cause an alternating electric current to be generated in the windings of the receiver coils 122, 124, 126. In the case of a time-division based transmission, the timing of the electric currents may indicate which of the transmitter coils 112, 114, 116 generated the magnetic field that resulted in the electric current. The receiver circuit 120 may be communicatively connected to each of the transmitter circuits in order to synchronize the timing of the receiver circuit with that of the transmitter circuits. In the case of a frequency-division based transmission, a frequency of the alternating electric current may indicate which of the transmitter coils 112, 114, 116 is responsible. The same type of time-division based and frequency-division based determinations may be made with respect to determining which transmitter circuit 110, 115 is responsible for any given portion of the electric current. In this fashion, each of the receiving coils in the receiving coil array may derive a set of magnetic field portions, whereby each portion is generated by a different transmitter circuit, and for each portion may further derive a set of components of the electromagnetic field portion, whereby each component of the set is generated by a different transmitter coil of the transmitter coil array of the transmitter circuit associated with the given portion of the detected magnetic field.

The receiver circuit 120 may further include an output circuit 128 for receiving the generated electric currents and providing the currents as electrical signals to an external device, such as to computing device(s) 130. The output to the system electronics may be an analog or digital signal, depending on the available hardware and software included in each of the output circuit 128 and the one or more computing devices 130.

The one or more computing devices 130 of the system electronics may include a processor 140, memory 150, and other components typically present in general purpose computers. The computing devices 130 may further include one or more input/output connections 160 for sending and receiving data from the transmitter circuit, receiver circuit or both.

The processor 140 may be a well-known processor or other lesser-known types of processors. Alternatively, the processor 140 can be a dedicated controller such as an ASIC. The memory 150 can store information accessible by the processor 140, including data 170 that can be retrieved, manipulated or stored by the processor 140, in accordance with instructions 180 stored in the memory. The memory 150 may be a type of non-transitory computer readable medium capable of storing information accessible by the processor 140, such as a hard-drive, solid state drive, tape drive, optical storage, memory card, ROM, RAM, DVD, CD-ROM, write-capable, and read-only memories.

Although the system described herein is not limited by a particular data structure, the data 170 may be stored in computer registers, in a data store as a structure having a plurality of different fields and records, or documents, or buffers. The data 170 may also be formatted in a computer-readable format such as, but not limited to, binary values, ASCII or Unicode. Moreover, the data 170 can include information sufficient to identify relevant information, such as numbers, descriptive text, proprietary codes, pointers, references to data stored in other memories, including other network locations, or information that is used by a function to calculate relevant data. The instructions 180 may be a set of instructions executed directly, such as machine code, or indirectly, such as scripts, by the processor 140. In this regard, the terms "instructions," "steps," "programs" and "routines" can be used interchangeably herein. The instructions 180 can be stored in object code format for direct processing by the processor 140, or other types of computer language including scripts or collections of independent source code modules that are interpreted on demand or compiled in advance.

Although FIG. 1 functionally illustrates the processor 140 and memory 150 as being within the same computing device block 130, the processor 140 and memory 150 may actually include multiple processors and memories that may or may not be stored within the same physical housing. For example, some of the data 170 and instructions 180 may be stored on a removable CD-ROM and others within a read-only computer chip. Some or all of the instructions and data can be stored in a location physically remote from, yet still accessible by, the processor 140. Similarly, the processor 140 can actually include a collection of processors, which may or may not operate in parallel.

In the example of FIG. 1, the data 170 may include information for determining a position and orientation of the receiver circuit 120 relative to a given one of the transmitter circuits 110, 115, or vice versa. For example, the data may include a signal matrix 172 from which the position and orientation (PnO) may be determined. The values included in the matrix 172 may be representations of the raw magnetic field data sensed by the receiver coils 122, 124, 126, including a magnitude and polarity of the magnetic field sensed from each one of the transmitter coils 112, 114, 116 of the given transmitter circuit 110, 115. A separate signal matrix 172 may be obtained for each one of the transmitter-receiver pairs. For instance, in a system having two transmitter circuits 110, 115, two matrices 172 may be stored for determining a position and orientation of the receiver circuit 120 relative to the two transmitter circuits 110, 115 in the tracking region at a given moment.

In the example of FIG. 1, in which three transmitter coils generate an electromagnetic field sensed by three receiver coils, the matrix may be a 3×3 matrix, whereby each component of the matrix may correspond to a different transmitter coil-receiver coil pair. Table 1 shows an example matrix:

TABLE 1

| $T_X R_X$ | $T_X R_Y$ | $T_X R_Z$ |
| $T_Y R_X$ | $T_Y R_Y$ | $T_Y R_Z$ |
| $T_Z R_X$ | $T_Z R_Y$ | $T_Z R_Z$ | whereby "$T_X R_X$" denotes a component of the electromagnetic field generated by the X-axis transmitter coil 112 and sensed by the X-axis receiver coil 122, "$T_X R_Y$" denotes a component of the electromagnetic field generated by the X-axis transmitter coil 112 and sensed by the Y-axis receiver coil 124, and so on. In other example configurations, M transmitter coils may be used, and N receiver coils may be used, whereby N is a value of two or more and may or may not be equal to three. In such configurations, an M×N matrix may be included in the PnO data. It should be recognized that if M×N<6, then it may be not be possible to solve for six variables using only the matrix, such that six degrees of freedom (such as three axes of position and three axes of orientation) of the receiver circuit may not be determined based only on the matrix. In such instances, additional sensor information may be required to provide a complete PnO determination. Nonetheless, it should be recognized that the concepts described herein are not limited to three- or more-dimensional transmitter and receiver coil arrays, and may be applied to two-dimensional arrays as well.

The data 170 may also include, for each constructed matrix 172, a respective weighting factor 174 for weighting the multiple constructed matrices with or against one another. Weighting the matrices may affect the influence that each respective matrix has towards a final PnO determination. For instance, a matrix assigned a high weighting factor may be more influential towards the final PnO determination than a matrix assigned a low weighting factor. The weighting factors may be determined based on a degree of reliability of the matrix towards determining the PnO of the receiver circuit 120. For any given matrix, reliability of the matrix may be a function of a degree of distortion in the magnetic field sensed by the receiver circuit in constructing the matrix. Distortion itself may be affected by a number of factors, such as a distance between the transmitter-receiver pair, as well as the presence of distorting elements in the vicinity of the transmitter-receiver pair. The distorting elements may have properties by which the magnetic field induces eddy currents at those elements, and the eddy currents may in turn create noise and distortions in the magnetic field. Examples of distorting elements may be objects positioned in or about the tracking region and containing any one or combination of, for example, aluminum, copper, or carbon steel.

Figure 2:
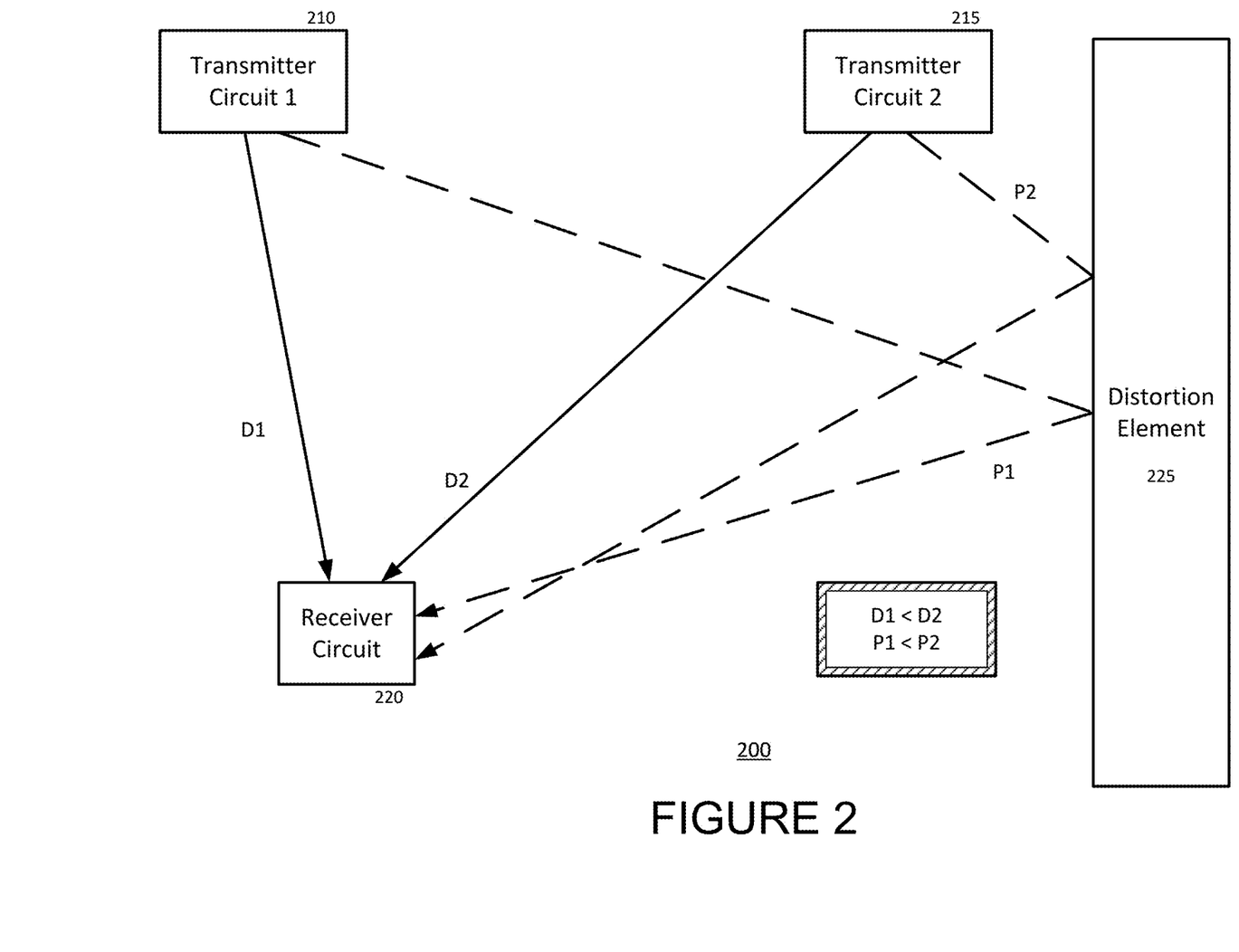
FIGS. 2 and 3 are diagrams representing motion of a receiver circuit of the electromagnetic tracking system of FIG. 1 in a tracked region.
Figure 3:
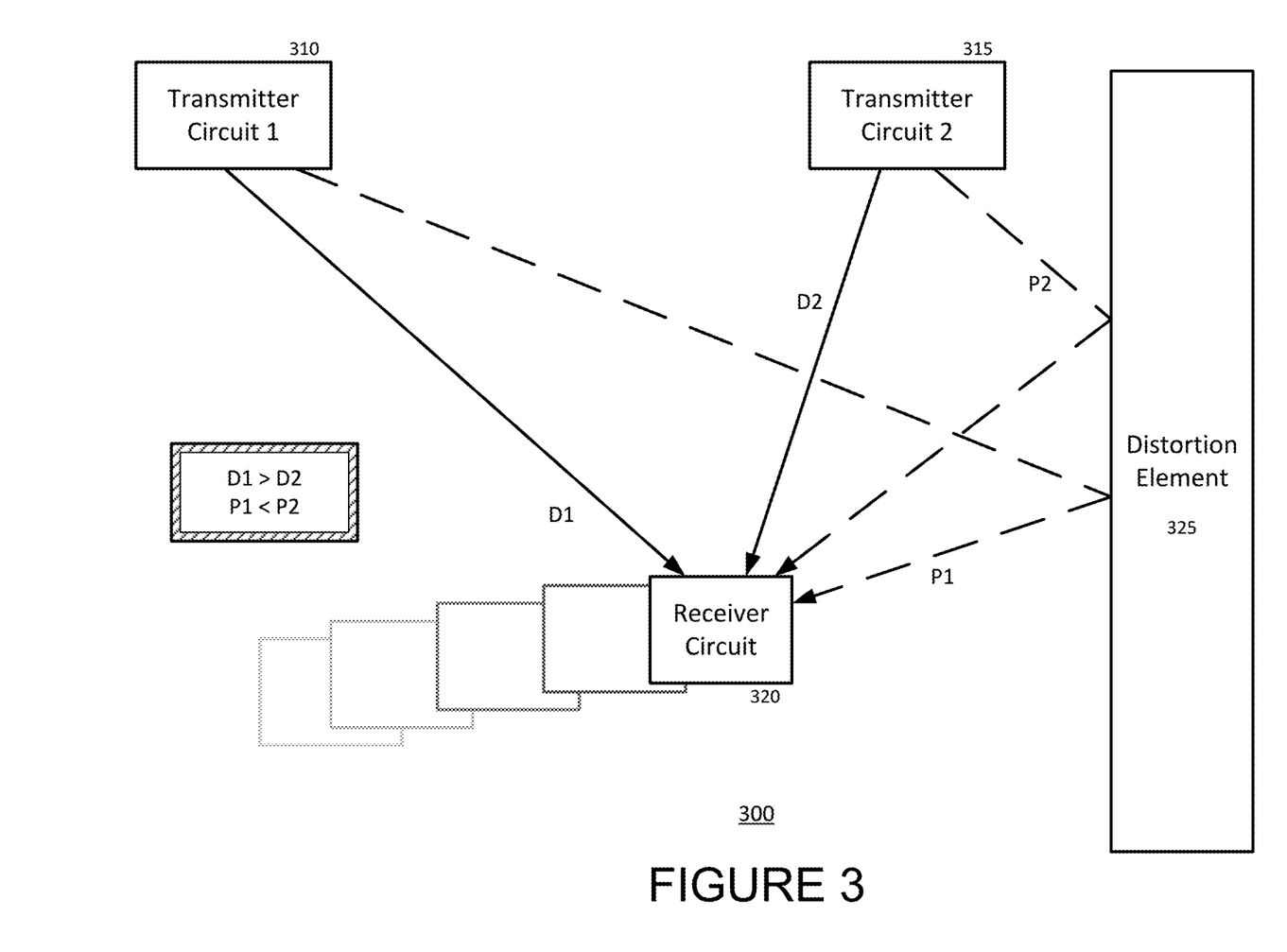

FIGS. 2 and 3 illustrate two example electromagnetic tracking system setups 200, 300 to demonstrate how reliability of a particular transmitter-receiver pair may change as a receiver circuit moves through a tracking region.

In the setup 200 of FIG. 2, two transmitter circuits 210, 215 are positioned at fixed locations of a tracking region or space. Both transmitter circuits 210, 215 generate respective magnetic fields that can be detected by the receiver circuit 220 and that can be distinguished from one another, such that the system electronics may be capable of constructing a first matrix based on the electrical signals generated at the receiver circuit 220 due to the detected magnetic field portion attributable to the first transmitter circuit 210, and a second matrix based on the electrical signals generated at the receiver circuit 220 due to the detected magnetic field portion attributable to the second transmitter circuit 215. The magnetic fields generated by both transmitter circuits 210, 215 may be capable of inducing eddy currents at the distortion element 225 positioned in the tracking region. In the example of FIG. 2, the distortion element 225 is positioned relatively far from the receiver (as compared to, say, in the setup 300 in FIG. 3).

It can be seen in FIG. 2 that a distance D1 between the first transmitter 210 and the receiver 220 is smaller than a distance D2 between the second transmitter 215 and the receiver 220. As such, at the receiver 220, a signal strength of the detected magnetic field portion from the first transmitter 210 is typically larger than a signal strength of the detected magnetic field portion from the second transmitter 215. Additionally, the distortion signal P1 from the first transmitter 210 detected by the receiver 220 travels a greater distance than and thus is typically weaker than the distortion signal P2 from the second transmitter 215 detected by the receiver 220. In the example of FIG. 2, it is fair to assume that that the transmitter closer to the receiver should be assigned a greater weighting factor. This assumption generally holds true for situations in which the distortion element 225 is positioned relatively far from the receiver, since the transmitter positioned relatively close to the distortion element 225 (as compared to a transmitter positioned farther from the distortion element 225) typically induces more distortion in the magnetic field and also typically has lower signal strength in the detected magnetic field portion of the receiver.

By contrast, in the setup 300 of FIG. 3, the two transmitter circuits 310, 315 are positioned at the same fixed locations of the tracking region, but the receiver circuit 320 is now at a position relatively close to the distortion element 325 (as compared to, say, in the setup 200 in FIG. 2). The distance D1 between the first transmitter 310 and the receiver 320 is now larger than the distance D2 between the second transmitter 315 and the receiver 320. As such, at the receiver 320, a signal strength of the detected magnetic field portion from the first transmitter 310 is typically smaller than a signal strength of the detected magnetic field portion from the second transmitter 315. However, the first transmitter 310 remains far from the distortion element 325, whereas the second transmitter 315 remains close to the distortion element. As such, the distortion signal P1 from the first transmitter 310 detected by the receiver 320 still travels a greater distance than and thus is still typically weaker than the distortion signal P2 from the second transmitter 315 detected by the receiver. Therefore, in the example of FIG. 3, there are competing factors for whether the first transmitter 310 or the second transmitter 315 should be assigned a greater weighting factor. Additionally, in the example of FIG. 3, the assumption that the detected magnetic field portion having the higher signal strength is more reliable is also not necessarily a given.

Thus, the example setups 200 and 300 of FIGS. 2 and 3 demonstrate that signal strength along may not always be sufficient or adequate for evaluating reliability of a magnetic source, or more particularly, a given magnetic source-sensor pairing when the sensor is at a particular location, generally a location relatively close to one or more distortion elements. As such, the weighting factor 174 associated with the matrix 172 may be based at least in part on a factor other than signal strength, such as an evaluation of the presence of distorting elements close to the corresponding transmitter.

Figure 5:
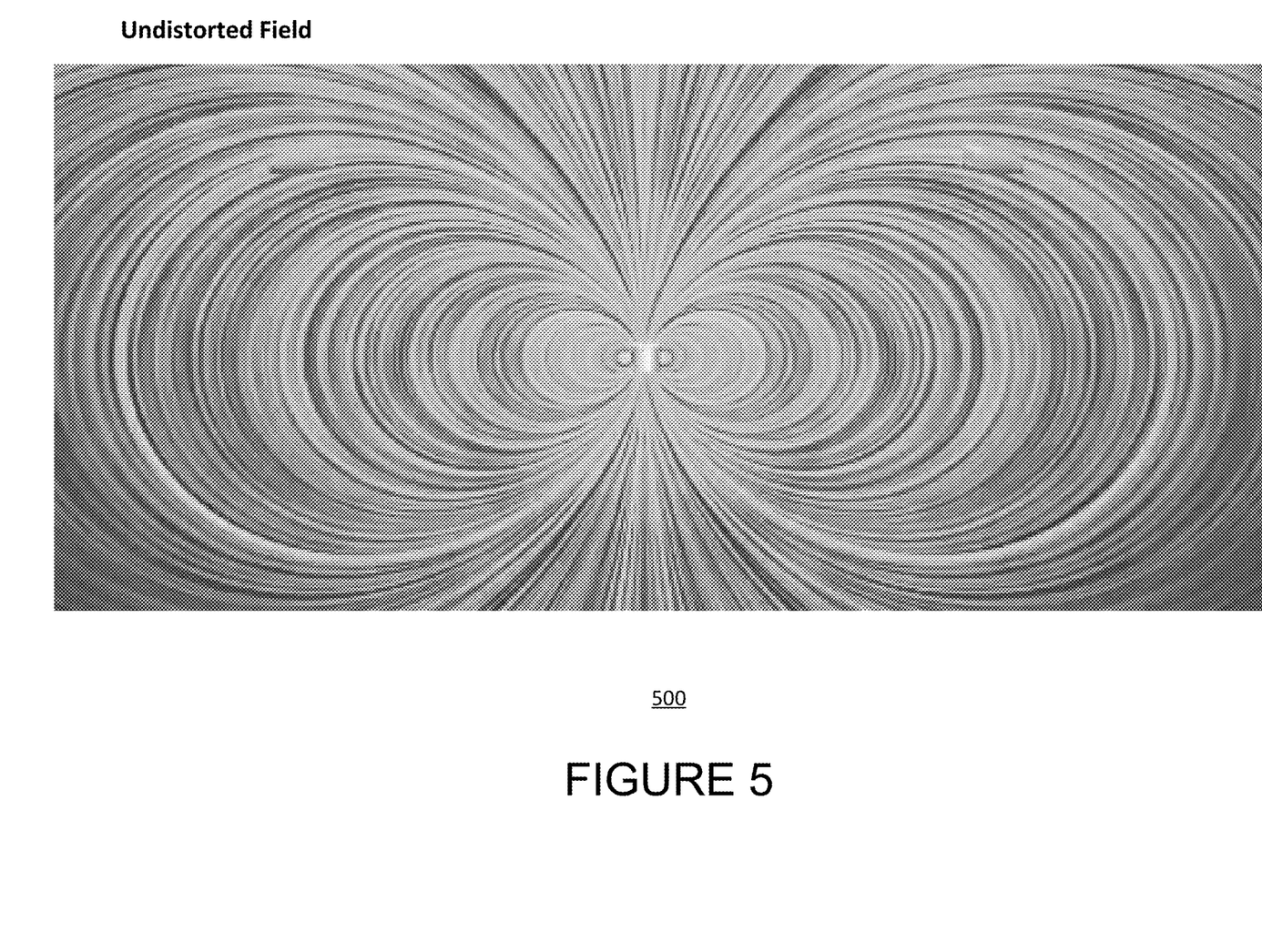
FIG. 5 is a diagram illustrating an undistorted dipole magnetic field.
Figure 6:
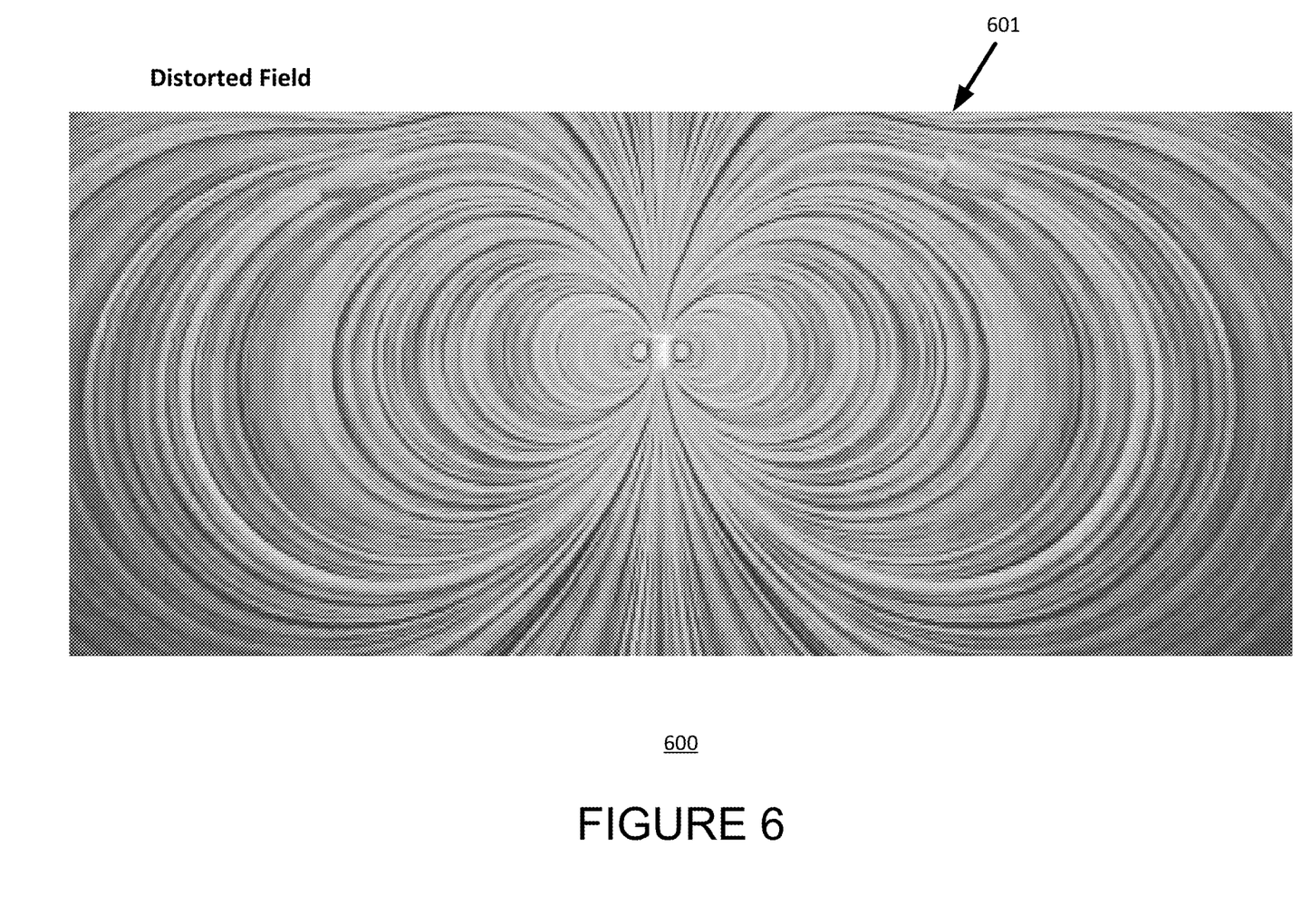
FIG. 6 is a diagram illustrating a distorted dipole magnetic field.

Techniques for this evaluation are discussed in greater detail below, in connection with FIGS. 4-6.

Returning to FIG. 2, the instructions 180 included in the memory 150 of the one or more computing device(s) 130 may include instructions for determining a position and/or orientation 182 of the receiver circuit 120 relative to the transmitter circuits 110, 115 based on the data 170. These instructions may include instructions for separating the electrical signals into their respective components and constructing the matrices with these components. In some examples, the PnO determination 180 may be based solely on the electrical signals generated by the receiver coils 122, 124, 126, and one or more of the multiple weighted matrices constructed based on these electrical signals. In other examples, the determination may be based on other signals received from other sensors included in the system 100 and in communication with the one or more computing devices 130, such as gyroscopes, accelerometers, magnetometers, barometers, and so on.

The instructions 180 may further include instructions for assigning weighting factors 184 to each of the constructed matrices based on the data 170. The weighting assignment for a given matrix may be based on one or more factors, including but not limited to: an analysis of the level of distortion 186 in the detected magnetic field portion associated with the given matrix; and a signal strength 188 of the electrical signals associated with the given matrix.

Figure 4:
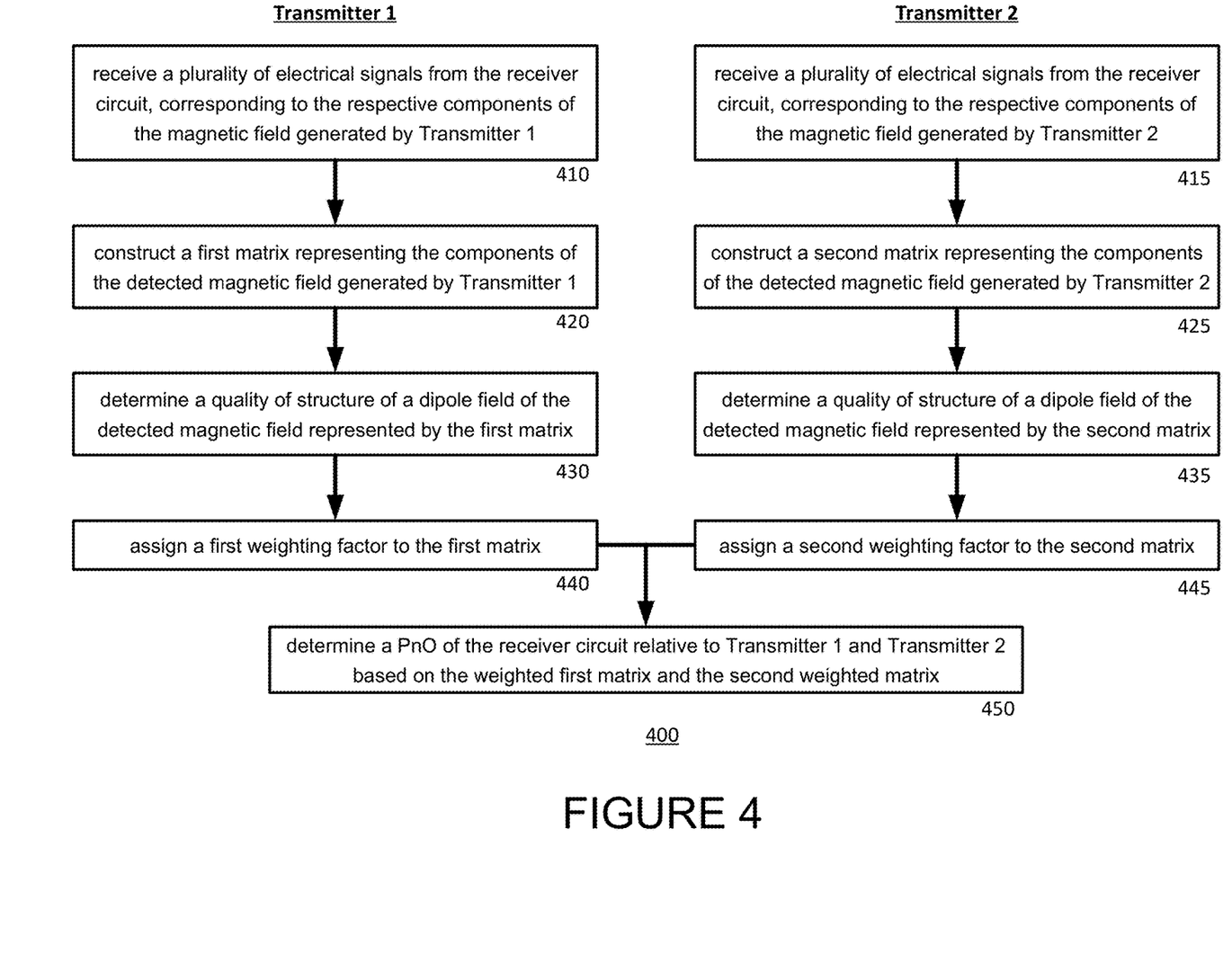
FIG. 4 is a flow diagram of an example routine in accordance with an embodiment of the present disclosure.

FIG. 4 is a flow diagram showing an example routine 400 for determining a position and/or orientation of a receiver circuit in an electromagnetic tracking system, such as the system 100 shown in FIG. 1. At least some of the operations in the routine 400 may be carried out by the computing device(s) of the system electronics. It should be understood that in other examples, steps may be added, subtracted, replaced or reordered in the routine 400.

At block 410, a plurality of electrical signals are received from the receiver circuit. The received electrical signals correspond to the respective components of the portion of the magnetic field detected by the receiver circuit that was generated by a coil array of a first transmitter circuit (Transmitter 1) positioned in or about a tracking region or space. This portion of the detected magnetic field may be referred to as associated with a particular transmitter-receiver pairing. Other portions of the detected magnetic field may be attributable to other transmitter circuits of the system.

As explained above, each electrical signal may have a magnitude, frequency and phase, and may correspond to a component of the magnetic field generated by a particular transmitter coil of the first transmitter circuit and detected by a particular receiver coil of the receiver circuit. This component may be referred to as associated with a particular transmitter coil-receiver coil pairing. Other electrical signals may represent components associated with different transmitter coil-receiver coil pairings of the particular transmitter-receiver pairing.

At block 420, a first matrix is constructed from the received electrical signals corresponding to the detected magnetic field generated by Transmitter 1. The matrix may have an M×N structure, M, being the number of coils in Transmitter 1, and N being the number of coils in the receiver circuit. Each component of the first matrix may correspond to the electrical signal of a different transmitter coil-receiver coil pairing.

At block 430, distortion of the first matrix is analyzed. The analysis may include a determination of a quality of structure of a dipole field of the detected magnetic field represented by the first matrix. Typically, a magnetic field detected by the receiver circuit is expected to have a uniform dipole field structure. For purposes of illustration, FIG. 5 shows an example of a uniform, undistorted dipole field structure 500. By contrast, when distortion elements are introduced to the tracking region, the distortion elements may cause unwanted noise that distorts the uniform dipole field structure. For purposes of illustration, FIG. 6 shows an example of a distorted dipole field structure 600, in which distortions 601 have the appearance of ripples in an otherwise uniform and symmetrical structure.

For a given matrix, the quality of structure of a given dipole field of the magnetic field represented by the given matrix may be determined based on a mathematical analysis of the matrix. For example, the mathematical analysis may involve determining a degree of symmetry of the matrix. More specifically, the mathematical analysis may involve comparing the matrix to values representative of an ideal dipole field. Modelling the transmitter coil as an ideal dipole may be a reasonable estimation when the receiver circuit is positioned at a significant distance from the transmitter coil, such as a distance at least four times greater than the transmitter coil radius. The magnetic field magnitude and direction (also referred to as a vector) of the ideal dipole may form the shape of a symmetrical ellipsoid, such that the detected magnetic field of a properly calibrated system should have magnetic field vectors matching this shape. In this manner, determining how close the detected magnetic field represented by the matrix is to the ideal dipole may indicate a level of distortion present in the detected magnetic field, whereby a greater similarity is indicative of more distortion, and less similarities is indicative of more distortion.

Returning to FIG. 4, at block 430, analyzing distortion of the first matrix may include analysis of factors other than a quality of structure of the detected magnetic field. For instance, distortion may also be a function of a strength of the detected magnetic field. A strong magnetic field may be indicative of a lower risk of distortion, such as if the distance between Transmitter 1 and the receiver circuit is low. Conversely, a weak magnetic field may be indicative of a higher risk distortion, such as if the distance between Transmitter 1 and the receiver circuit is high.

At block 440, a first weighting factor is assigned to the first matrix. The first weighting factor may be assigned based on a function of the analyzed distortion from block 430, whereby a lower level of distortion results in a higher weighting factor, and whereby a higher level of distortion results in a lower weighting factor.

In FIG. 4, blocks 415, 425, 435 and 445, correspond to the blocks 400, 410, 420 and 430, respectively, except that blocks 415, 425, 435 and 445 are directed to processing the electrical signals associated with the second transmitter circuit (Transmitter 2) to construct, analyze and assign a weighting factor to a second matrix, whereas blocks 400, 410, 420 and 430 are directed to processing the electrical signals associated with the Transmitter 1 to construct, analyze and assign a weighting factor to the first matrix. Construction and analysis of the first and second matrices may be performed in parallel or in sequence.

At block 450, a PnO of the receiver circuit relative to Transmitters 1 and 2 is determined based on the first matrix and the second matrix and the respective weighting factors of the matrices. The matrices may be blended or otherwise combined using a statistical analysis, such as by averaging the matrices according to the assigned weights. Combining the matrices may result in a single matrix, which may be analyzed to determine the PnO of the receiver circuit.

Alternatively, each matrix may be analyzed independently in order to arrive at respective PnO determinations for each matrix. The PnO determinations may then be combined according to the respective weighting factors.

In some examples, one of the first matrix or the second matrix may be selected and the other matrix may be discarded. In essence, this may amount to the discarded matrix having a weighting factor of zero. For example, if the distortion analysis at blocks 430 and 432 result in a determination of a detected magnetic field associated with a given matrix having a level of distortion above a threshold amount, then that given matrix may be assigned a weighting factor of zero and thus essentially discounted from the PnO determination at block 450.

Additionally, in some examples, both the first matrix and the second matrix may have a level of distortion above a threshold amount. In such a case, the one or more computing devices may be programmed to not assign a zero weighting factor to both results, and thus to not discard the results, since this would result in no PnO determination at all. Alternatively, if the system is a hybrid tracking system including other, non-magnetic tracking devices, the one or more computing devices may be programmed to discard both results, and to rely on PnO data from the non-magnetic tracking system.

Additionally, with regard for the inclusion of non-magnetic tracking devices in a hybrid tracking system, it should also be recognized that the adaptive weighting techniques may be applied between hybrid PnO determinations. For example, if the fixed electromagnetic tracking elements (either transmitters or receivers) were to include non-magnetic tracking devices such as optical sensors or acoustic sensors, then each fixed tracking element could independently derive both a magnetic PnO determination and a non-magnetic PnO determination. These independent PnO solution from the separate fixed elements of the hybrid tracking system could then be mixed with one another, such as by using the mixing and filtering techniques described in the co-owned and concurrently filed application titled "Dynamic Mixing of and Switching Between Sensor Measurements in Hybrid Trackers Using Electromagnetic Tracking," to derive independent PnO solutions. Those solutions may then be assigned weighting factors according to the techniques of the present disclosure, and combined with one another based on the assigned weighting factors.

The above examples generally describe a system for tracking the PnO of a receiver circuit. However, it should be understood that the receiver circuit may be mounted or otherwise affixed to another object, and that the PnO of the other object may be tracked based on the electrical signals from the receiver circuit. Such objects may include but are not limited to a wearable or handheld object operated by a user, such as a helmet, a handheld surgical device, or a stylus. More generally, the methods and systems of the present disclosure may be applicable to, but are not limited to tracking the PnO of head mounted displays (HMD), handheld or wearable devices for surgical navigation (including simulations of surgical procedures), and handheld or wearable devices virtual reality or augmented reality programs.

For applications in which the user is not travelling, the plurality of transmitter circuits may be mounted or otherwise affixed to one or more fixed platforms, such as tripods or surfaces located in or about the tracking region. For applications in which the user is travelling, such as in a vehicle, the plurality of transmitter circuits may be mounted to a frame of vehicle. In any of the above described instances, the transmitter circuits may be calibrated to permit for the transmitter circuits to align with a fixed frame of reference against which the PnO of the tracked object is evaluated.

The above examples generally describe systems and methods in which a receiver circuit is mounted to the tracked object and moving about the tracking region, while a plurality of transmitter circuits are positioned in fixed locations to track the one receiver circuit. However, due to the reciprocal nature of electromagnetic tracking systems, an alternative configuration may involve providing a plurality of receiver circuits in fixed locations, and affixing a transmitter circuit to the tracked object. Such an arrangement will still result in having two transmitter-receiver pairs, and this will result in independent construction of two matrices corresponding to the respective transmitter-receiver pairs.

Utilizing a single transmitter circuit in place of a single receiver circuit can simplify some aspects of the system. First of all, with a single transmitter circuit at a single location, it is no longer necessary to time-division or frequency-division multiplex multiple transmitter circuits with one another. A single magnetic field may be generated by the transmitter circuit, and then separately detected by the multiple receiver circuits positioned about the tracking region. As long as the one or more processors is capable of distinguishing between the electrical signals received from each receiver circuit (e.g., using an identification, such as header data, in the received electrical signals), then the matrices associated with the respective receiver circuits may be constructed, analyzed and weighted independently of one another.

The above examples generally describe a system having two fixed elements, either transmitter circuits or receiver circuits. However, due to the separate determination of PnO using each transmitter-receiver pair, it should be understood that the system may include any number of fixed elements, and that the PnO determinations associated with each element could be combined with one another using the same or similar techniques and principles.

The above examples generally describe a receiver circuit that includes an array of coils in order to detect the magnetic field generated by the transmitter circuit or circuits. However, in other examples, the receiver circuit may include sensing elements other than coils. For example, the receiver circuit may include one or more Hall effect sensing elements. It should be understood that the receiver coils of any of the above examples and embodiments may be replaced with the alternative receiver elements without changing the underlying nature of the systems and methods.

Although the present disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims.

The invention claimed is:

1. An apparatus comprising:
   memory for storing instructions; and
   one or more processors for executing the instructions, wherein the instructions stored in the memory are configured to cause the one or more processors to:
   receive a plurality of electrical signals from a receiver circuit including a plurality of receiver elements aligned at different receiver axes, each receiver element configured to detect a magnetic field along its respective receiver axis;

construct each of a first matrix and a second matrix from the plurality of electrical signals, the first matrix representing respective components of a first magnetic field portion generated by a first transmitter circuit including a plurality of first transmitter coils aligned at different first transmitter axes, the second matrix representing respective components of a second magnetic field generated by a second transmitter circuit including a plurality of second transmitter coils aligned at different second transmitter axes, wherein the first transmitter circuit and the second transmitter circuit are spaced apart from one another within a common region such that the respective first and second magnetic field portions overlap one another within the common region and are distinguishable from one another by differences in at least one of timing and frequency;

for each constructed matrix, assign a weight to the constructed matrix based at least in part on a quality of structure of the electromagnetic field represented by the constructed matrix; and determine a position and an orientation of the receiver circuit based at least in part on the first matrix, the second matrix, and the respective assigned weights.

2. The apparatus according to claim 1, wherein the instructions are configured to cause the one or more processors to:

for each constructed matrix, assign the weight to the constructed matrix based further on a signal strength of the magnetic field portion represented by the constructed matrix.

3. The apparatus according to claim 2, wherein the instructions are configured to cause the one or more processors to:

for each constructed matrix, determine the quality of structure and the signal strength of the magnetic field portion based on a mathematical analysis of the constructed matrix.

4. The apparatus according to claim 1, wherein the quality of structure of the magnetic field portion represented by the constructed matrix is indicative of a degree of distortion in the magnetic field portion represented by the constructed matrix.

5. The apparatus according to claim 4, wherein the instructions are configured to cause the one or more processors to:

determine the quality of structure of the magnetic field portion represented by the constructed matrix based on a degree of symmetry of the constructed matrix.

6. The apparatus according to claim 1, wherein each row of the constructed matrix corresponds to a common receiver element, and wherein each column of the constructed matrix corresponds to a common transmitter coil, whereby each respective component of the magnetic field portion represented by the constructed matrix corresponds to a different transmitter coil-receiver element pair.

7. The apparatus according to claim 1, wherein the instructions stored in the memory are configured to cause the one or more processors to:

identify electrical signals having a first frequency or one of a first set of frequencies as being associated with the first magnetic field portion; and identify electrical signals having a second frequency or one of a second set of frequencies as being associated with the second magnetic field portion.

8. The apparatus according to claim 1, wherein the first transmitter circuit and a phase of the second transmitter are synchronized with one another, and wherein the instructions stored in the memory are configured to cause the one or more processors to:

identify electrical signals generated at the receiver circuit during a first time as being associated with the first magnetic field portion; and identify electrical signals generated at the receiver circuit during a second time as being associated with the second magnetic field portion.

9. An electromagnetic tracking system comprising:

a first electromagnetic tracking element configured to be affixed to a trackable object;

a plurality of second electromagnetic tracking elements configured to be positioned separately from one another at fixed locations of a tracking region through which the trackable object is capable of moving, wherein the first electromagnetic tracking element is one of (i) a transmitter circuit including a plurality of transmitter coils aligned at different transmitter axes and configured to generate a magnetic field or (ii) a receiver circuit including a plurality of receiver elements aligned at different receiver axes, each receiver element configured to detect a magnetic field along its respective receiver axis, wherein each receiver element is configured to detect respective components of the magnetic field generated by each of the transmitter coils, and generate an electrical signal corresponding to the detected respective components of the magnetic field, wherein the plurality of second electromagnetic tracking elements is a plurality of the other one of (i) the transmitter circuit and (ii) the receiver circuit, whereby the electromagnetic tracking system includes a plurality of transmitter-receiver pairs between the first electromagnetic tracking element and the respective plurality of second electromagnetic tracking elements; and one or more processors configured to:

for each given one of the plurality of transmitter-receiver pairs:

receive a plurality of electrical signals from the receiver circuit of the given transmitter-receiver pair, the plurality of electrical signals corresponding to respective components of the magnetic field generated by the transmitter circuit of the given transmitter-receiver pair and detected by a corresponding one of the receiver elements;

construct a matrix representing the respective components of the magnetic field detected by the plurality of receiver elements, wherein each row of the first matrix corresponds to a common receiver element, and wherein each column of the first matrix corresponds to a common transmitter coil, whereby each respective component represented in the matrix corresponds to a different transmitter coil-receiver element pairing of the given transmitter-receiver pair;

for each constructed matrix:

determine a quality of structure of a dipole field detected by the plurality of receiver elements based at least in part on an analysis of the constructed matrix; and assign a weight to the constructed matrix based at least in part on the determined quality of structure; and determine a position and an orientation of the first electromagnetic tracking element relative to the plurality of second electromagnetic tracking elements based on the constructed matrices and the respective assigned weights.

10. The system of claim 9, wherein the one or more processors are configured to, for each constructed matrix, assign the weight to the constructed matrix based further on a signal strength of the magnetic field represented by the constructed matrix.

11. The system according to claim 10, wherein the one or more processors are configured to, for each constructed matrix, determine the quality of structure and the signal strength of the magnetic field based on a mathematical analysis of the constructed matrix, wherein the quality of structure of the magnetic field represented by the constructed matrix is indicative on a degree of distortion in the magnetic field represented by the constructed matrix.

12. The system according to claim 9, wherein the one or more processors are configured to determine the quality of structure of the magnetic field represented by the constructed matrix based on a degree of symmetry of the constructed matrix.

13. The system according to claim 9, wherein the first electromagnetic tracking element is a receiver circuit and the plurality of second electromagnetic tracking elements are transmitter circuits, and wherein the transmitter circuits are operable to generate respective magnetic fields that overlap one another within the tracking region and such that the respective magnetic fields are multiplexed and distinguishable from one another by differences in at least one of timing and frequency.

14. A head mounted display system comprising:
the electromagnetic tracking system according to claim 9; and
a head mounted display coupled to the electromagnetic tracking system, wherein the electromagnetic tracking system is configured to track a position and orientation of a user of the head mounted display.

15. A tracking system comprising:
the electromagnetic tracking system according to claim 9; and
a wearable or handheld tracking device, wherein the receiver circuit is mounted to the tracking device to track a position and orientation of the tracking device.

16. A method for determining a position and orientation of an object, wherein a first electromagnetic tracking element is affixed to the object and a plurality of second electromagnetic tracking elements are positioned separately from one another at fixed locations of a tracking region through which the object is capable of moving, wherein the first electromagnetic tracking element is one of (i) a transmitter circuit including a plurality of transmitter coils aligned at different transmitter axes and configured to generate a magnetic field or (ii) a receiver circuit including a plurality of receiver elements aligned at different receiver axes, each receiver element configured to detect a magnetic field along its respective receiver axis, wherein each receiver element is configured to detect respective components of the magnetic field generated by each of the transmitter coils and generate an electrical signal representing the detected respective components of the magnetic field, and wherein the plurality of second electromagnetic tracking elements is a plurality of the other one of (i) the transmitter circuit and (ii) the receiver circuit, whereby the electromagnetic tracking system includes a plurality of transmitter-receiver pairs between the first electromagnetic tracking element and the respective plurality of second electromagnetic tracking elements, the method comprising:

for each given one of the plurality of transmitter-receiver pairs:
constructing, by one or more processors, a matrix representing respective components of the magnetic field detected by the plurality of receiver elements, wherein each row of the matrix corresponds to a common receiver element, and wherein each column of the first matrix corresponds to a common transmitter coil, whereby each respective component represented in the matrix corresponds to a different transmitter coil-receiver element pairing of the given transmitter-receiver pair; and
assigning, by the one or more processors, a weighting factor to the constructed matrix based at least in part on a quality of structure of the magnetic field represented by the constructed matrix; and
determining, by the one or more processors, the position and the orientation of the object based at least in part on the constructed matrices, and the respective assigned weighting factors.

17. The method of claim 16, further comprising, for each constructed matrix, determining, by the one or more processors, the quality of structure of the magnetic field represented by the constructed matrix based on a mathematical analysis of a symmetry of the constructed matrix.

18. The method of claim 17, further comprising, for each constructed matrix, determining, by the one or more processors, a contribution of one or more distorting signals to the constructed matrix based at least in part on the determined quality of structure.

19. The method of claim 18, further comprising, for each constructed matrix, determining, by the one or more processors, the weighting factor for the constructed matrix based on each of:
the determined contribution of one or more distorting signals to the magnetic field represented by the constructed matrix; and
respective magnitudes of the plurality of electrical signals used to construct the matrix.

20. The method according to claim 16, wherein the first electromagnetic tracking element is a receiver circuit and the plurality of second electromagnetic tracking elements are transmitter circuits, the method further comprising distinguishing, by the one or more processors, the respective magnetic fields generated by the plurality of second electromagnetic tracking elements from one another based on at least one of a frequency or a phase of the plurality of electrical signals generated by the receiver circuit.

21. The method according to claim 16, wherein each of the plurality of second electromagnetic tracking elements includes a non-magnetic tracking device configured to independently track at least one of a position or orientation of the object, the method further comprising:
for each given non-magnetic tracking device:
determining, by the one or more processors, at least one of a position or orientation of the object based on data from the given non-magnetic tracking device; and
combining, by the one or more processors, the determined at least one of a position or orientation of the object with at least one of the position or the orientation of the object determined from the matrix derived from the magnetic field generated by the second electromagnetic tracking element in which the given non-magnetic tracking device is included;
for each given second electromagnetic tracking element, assigning, by the one or more processors, a weighting factor to the given second electromagnetic tracking element based on the assigned weighting factor for the constructed matrix derived from the magnetic field generated by the given second electromagnetic tracking element; and determining, by the one or more processors, a hybrid position and orientation of the object based at least in part on the combined determined position and orientation from at least one second electromagnetic tracking element and the weighting factors assigned to the second electromagnetic tracking elements.

* * * * *